United States Patent [19]

Cotreau

[11] Patent Number: 5,515,434
[45] Date of Patent: May 7, 1996

[54] IMPEDANCE SETTING CIRCUIT FOR A SLIC

[76] Inventor: Gerald M. Cotreau, 8615 Sheridan Rd., Melbourne, Fla. 32904

[21] Appl. No.: 267,434

[22] Filed: Jun. 29, 1994

[51] Int. Cl.[6] .................................................. H04M 1/76
[52] U.S. Cl. .................................... 379/399; 379/398
[58] Field of Search ................................... 379/398, 399, 379/403, 404, 413, 405, 410

[56] References Cited

U.S. PATENT DOCUMENTS

| | | | |
|---|---|---|---|
| 4,203,012 | 5/1980 | Boxall | 379/405 |
| 4,300,023 | 11/1981 | Kelley et al. | 379/405 |
| 4,458,112 | 7/1984 | Svala | 379/405 |
| 4,485,341 | 11/1984 | Welty et al. | 379/405 |
| 4,757,527 | 7/1988 | Beniston et al. | 379/410 |
| 4,982,426 | 1/1991 | Jakab | 379/399 |
| 5,020,102 | 5/1991 | Schorr | 379/399 |
| 5,271,059 | 12/1993 | Dielacher et al. | 379/399 |
| 5,295,186 | 3/1994 | Okamoto | 379/399 |
| 5,323,460 | 6/1994 | Warner et al. | 379/413 |
| 5,329,585 | 7/1994 | Susak et al. | 379/403 |
| 5,343,520 | 8/1994 | Willocx et al. | 379/399 |
| 5,402,485 | 3/1995 | Takato et al. | 379/399 |

*Primary Examiner*—Jeffery Hofsass
*Assistant Examiner*—Scott Wolinsky
*Attorney, Agent, or Firm*—Rogers & Killeen

[57] ABSTRACT

A current mode subscriber line interface circuit (SLIC) for telephone system in which AC and De impedances for tip and ring connections of the SLIC are separately set. A DC filter separates the DC and AC components of tip and ring currents, and a current amplifier amplifies the AC components separately from the DC components. A pair of resistors set the AC impedance value, and also may be used to set SLIC four-wire to two-wire gain separately from SLIC two-wire to four-wire gain.

20 Claims, 5 Drawing Sheets

IMPEDANCE SETTING CIRCUIT FOR A SLIC

BACKGROUND OF THE INVENTION

The present invention relates to a subscriber line interface circuit (SLIC) for a telephone system, and more particularly to a current mode subscriber line interface circuit in which the AC and DC impedances for tip and ring connections of the SLIC are separately set, and in which the same circuitry may also be used to set SLIC four-wire to two-wire gain separately from SLIC two-wire to four-wire gain.

A telephone system subscriber line interface circuit connects a balanced two-wire transmission path (the path to and from the subscriber telephone handset) with an unbalanced four-wire transmission path (the path to and from the telephone central station). SLICs perform various functions, including battery feed, overvoltage protection, ringing, signaling, hybrid, and timing.

SLIC operation is known and need not be considered in detail. By way of brief explanatory example, and with reference to FIG. 1, a current mode SLIC 10 (a SLIC that processes the currents related to the signals in the transmission paths, rather than the voltages) uses current information available in the tip and ring voltage sensing resistors R1 and R2 at the two-wire side of the SLIC. The current information is provided to a hybrid circuit 12 that detects incoming signals and sends them in the right direction. The hybrid circuit 12, in combination with external circuitry 14 connected to the four-wire side of the SLIC, provides appropriate amplification, transhybrid echo cancellation, and impedance matching.

Figure 1:
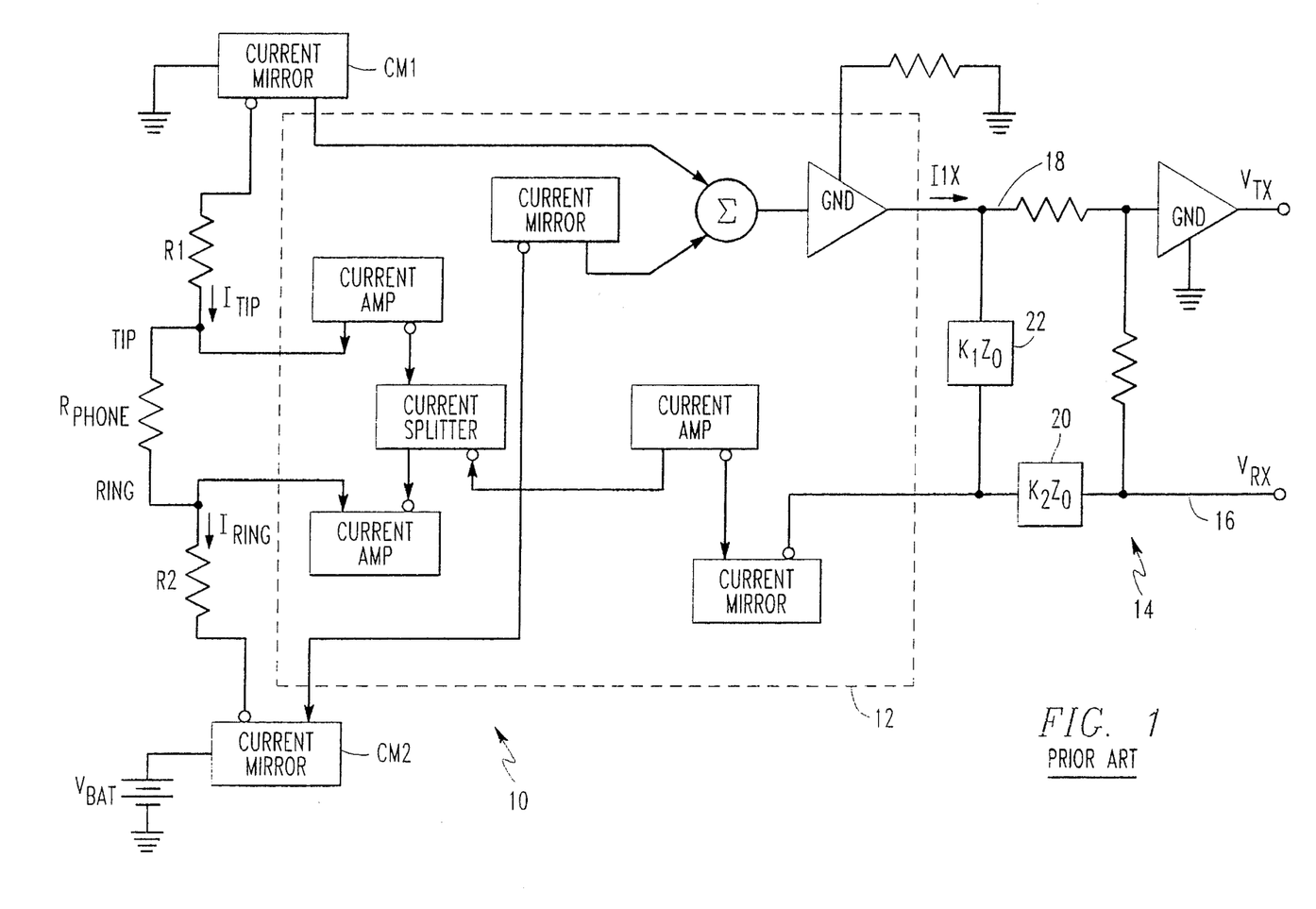
FIG. 1 is a block diagram of a current mode subscriber line interface circuit (SLIC) of the prior art.

SLIC two-wire return loss is reduced by impedance matching. The two-wire subscriber line is a transmission path with an impedance, typically hundreds of ohms (e.g., 600 to 900Ω). The SLIC connected to the subscriber's line desirably has a matching impedance to prevent two-wire echo, also known as two-wire return loss. Conventionally, impedance matching has been carried out at the four-wire side of the SLIC by synthesizing a two-wire impedance $Z_0$ that approximates the impedance in the two-wire transmission paths. The synthesized impedance $Z_0$ is combined with the transmit signal current ITX and then with the receive signal current IRX so as to provide an impedance correction factor that matches, or nearly matches, SLIC impedance to the two-wire impedance. An impedance correction factor, $K_1Z_0$, has been provided by an impedance element 22 connecting the transmit path 18 and the receive path 16. The gain of the signal in the receive path 16 is adjusted with impedance element 20 before the signal in the path is corrected with the impedance element 22. The gain adjustment, $K_2Z_0$, and the impedance correction factor are related, with the gain adjustment being a function of the impedance factor (typically $K_1 > K_2$).

Figure 2:
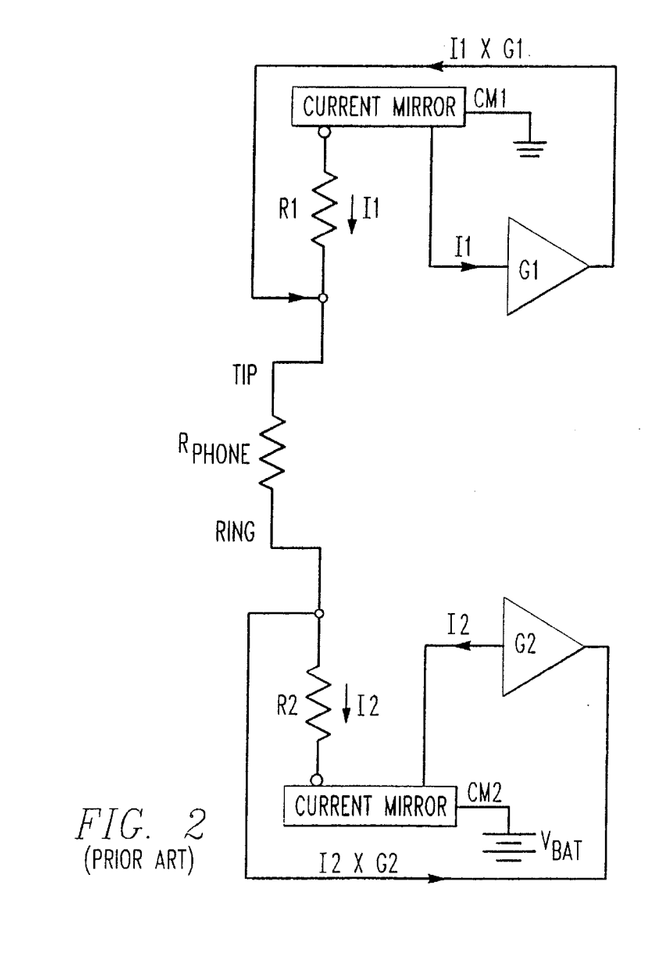
FIG. 2 is a partial block diagram of a prior art SLIC depicting functional operation of the two-wire side of the SLIC.

Functionally, the two-wire side of a current mode SLIC operates as depicted in FIG. 2. The tip and ring voltages at the telephone line terminals are converted to currents by imposing the voltages across resistors R1 and R2 and thereafter provided to current mirrors CM1 and CM2. Current mirrors are well known, being discussed for example, in U.S. Pat. No. 4,203,012 issued to Boxall May 13, 1980. Current mirrors provide one or more copies of an incoming signal and may also be current amplifiers, multiplying a reflected current by an amount N that may be larger or smaller than one. When a current mirror provides more than one copy, each copy may be multiplied by a separate N.

The tip current, I1, is proportional to the voltage at the tip connection of the telephone line, and the ring current, I2, is proportional to the voltage at the ring connection of the telephone line.

$$I1 = (\text{Ground} - V_{TIP})/R1 \tag{1}$$

$$I2 = (V_{RING} - V_{BATTERY})/R2 \tag{2}$$

Synthesized impedances of appropriate magnitude are provided to the two-wire side by increasing the gain of I1 and I2 in current gain blocks G1 and G2. As will be appreciated, the synthesized impedance is a function of both resistance and gain. For example, the impedances at the tip and ring connections are:

$$Z_{TIP} = R1/(1+G1) \tag{3}$$

$$Z_{RING} = R2/(1+G2) \tag{4}$$

However, the resistances of R1 and R2 and the gains G1 and G2 are not independent and must be changed together when an impedance is adjusted. As the gains may be complex, the adjustment is usually not a simple one.

Further, and perhaps more significantly, the AC and DC impedances are changed together. Typically, one of the AC and DC impedances is at the desired level while the other is not. Hence, the selection of components and their characteristics is based on compromises in SLIC performance so that the SLIC will be made to operate within the range of impedances encountered in the telephone system.

Many of the components used in a SLIC for impedance matching also affect SLIC four-wire to two-wire gain and SLIC two-wire to four-wire gain (four-wire to two-wire gain, is $V_{RX}/V_{TR}$, where $V_{TR}$ is $V_{TIP} - V_{RING}$; two-wire to four-wire gain, is $V_{TX}/(V_{TR})$). This interrelationship further complicates SLIC design and operation. As with the selection of impedances, gain values are established during SLIC design based on compromises in performance. It is desirable to provide a SLIC in which gains may be adjusted simply using components that may be easily integrated into the SLIC.

Accordingly, it is an object of the present invention to provide a novel circuit and method of operating a SLIC that obviates the problems of the prior art.

It is another object of the present invention to provide a novel circuit and method of operating a SLIC in which AC and DC impedances for tip and ring connections of the SLIC are separately set.

It is yet another object of the present invention to provide a novel circuit and method of operating a SLIC in which the AC and DC components are extracted from the tip and ring currents and amplified separately.

It is still another object of the present invention to provide a novel circuit and method of operating a SLIC in which the circuitry for separately setting AC and DC impedances also may be used to separately set SLIC four-wire to two-wire gain and two-wire to four-wire gain.

It is a further object of the present invention to provide a novel circuit and method of operating a current mode SLIC in which the AC and DC components are extracted from the tip and ring currents using a DC filter.

It is yet a further object of the present invention to provide a novel circuit and method of operating a SLIC in which the circuitry for separately setting SLIC four-wire to two-wire gain and two-wire to four-wire gain includes two resistors, and wherein the ratio of resistances of the two resistors sets both the SLIC four-wire to two-wire gain and the AC impedance for the tip and ring connections.

These and many other objects and advantages of the present invention will be readily apparent to one skilled in the art to which the invention pertains from a perusal of the claims, the appended drawings, and the following detailed description of preferred embodiments.

DESCRIPTION OF PREFERRED EMBODIMENTS

A current mode subscriber line interface circuit (SLIC) for a telephone system may be improved by separately setting the AC and DC impedances for the tip and ring connections of the SLIC. In a preferred embodiment, a DC filter may be used to separate the DC and AC components of tip and ring currents, and a current amplifier may be used to amplify the AC components separately from the DC components. A pair of resistive elements may be used to set the AC impedance value, and also may be used to set SLIC four-wire to two-wire gain separately from SLIC two-wire to four-wire gain.

An embodiment of the improved SLIC circuitry will be discussed below in relation to FIG. 6, but an understanding of the circuitry may be more easily achieved by tracking development of the circuitry sequentially through FIGS. 3 to 6.

Figure 3:
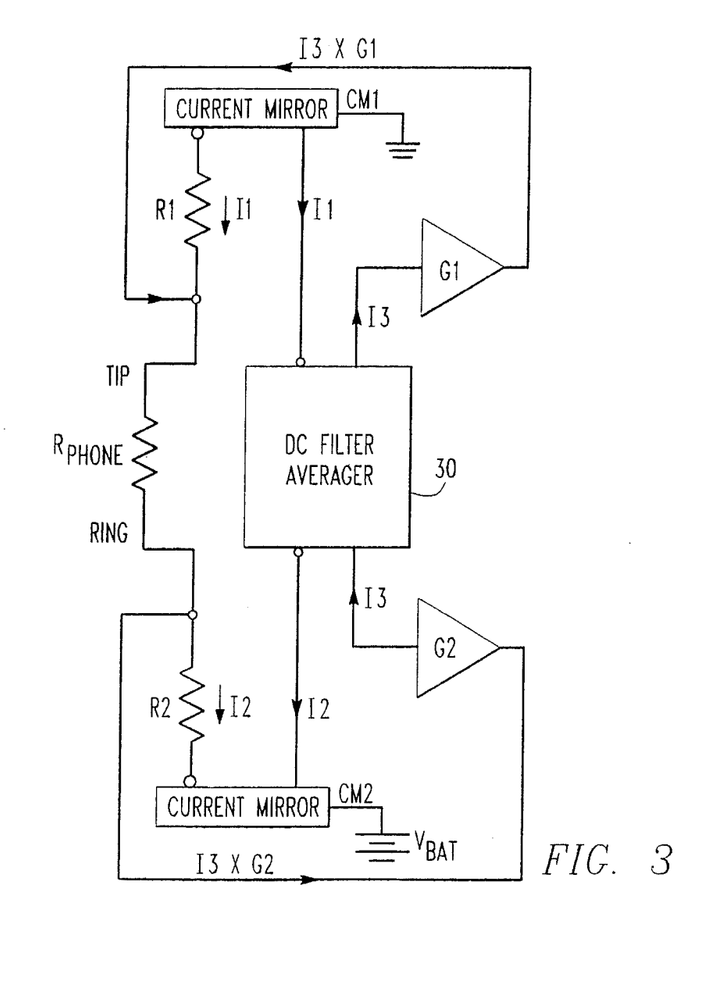
FIG. 3 is a partial block diagram of an embodiment of a SLIC of the present invention depicting functional operation of the two-wire side of the SLIC.

With reference now to FIG. 3, a synthesized DC impedance may be provided to the tip and ring connections by means of a DC filter 30 in which the AC components of I1 and I2 are removed and the remaining DC components combined. The filter 30 may also function as an averager by combining the two DC components and dividing by two to obtain an average current I3.

$$I3=(I1DC+I2DC)/2 \quad (5)$$

An average current I3 may also obtained by combining the DC components of the currents from CM1 and CM2 without dividing by two in the event the current mirrors CM1 and CM2 are arranged so that the amplitude of the reflected current is one half the impinging current.

The embodiment of FIG. 3 may find use in current mode SLICs without the further circuitry discussed below if, for example, only the DC impedance components are to be fed back to the two-wire side of the SLIC. The synthesized DC impedances provided to tip and ring connections are:

$$Z_{TIP}DC=(R1+R2)/(2(1+G1)) \quad (6)$$

$$Z_{RING}DC=(R1+R2)/(2(1+G2)) \quad (7)$$

These will be equal to the impedances in equations (3) and (4) if R1 equals R2.

The filter 30 may be conventional and include conventional components for combining and averaging the currents I1DC and I2DC.

Figure 4:
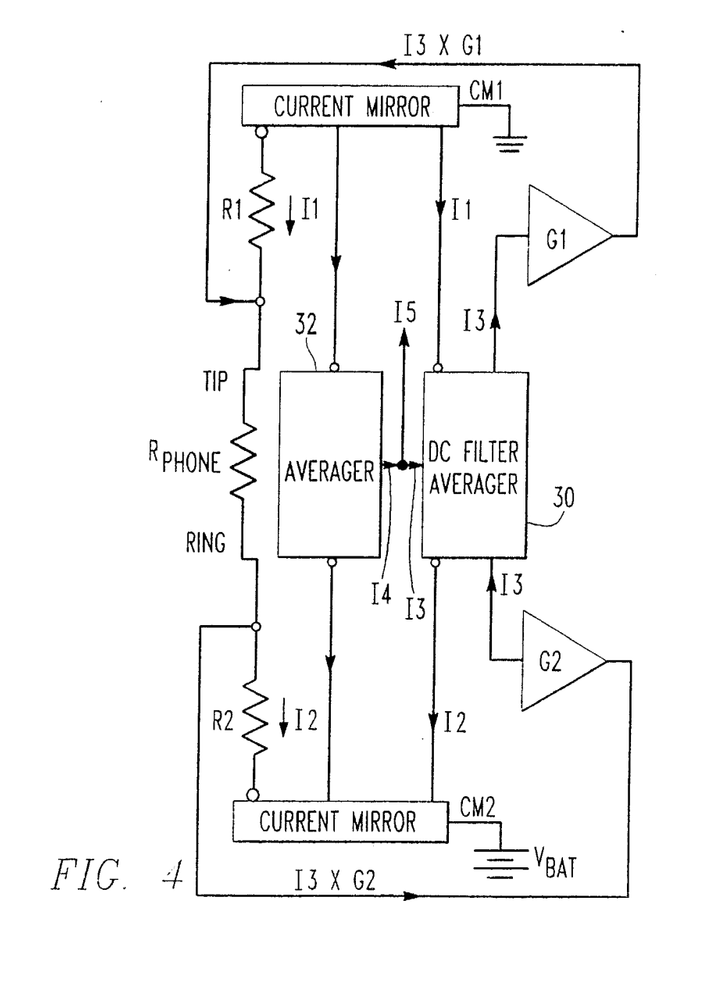
FIG. 4 is a partial block diagram of a modification of the embodiment of FIG. 3.

With reference now to FIG. 4, an AC component, I5, may be provided by averaging I1 and I2 in second averager 32 to provide I4 and combining I3 and I4 so that the DC component is removed.

$$I4=(I1+I2)/2=(I1DC+I2DC+I1AC+I2AC)/2 \quad (8)$$

$$I5=I4+(-I3)=(I1AC+I2AC)/2 \quad (9)$$

As above, the average of I1 and I2 may be obtained without dividing in the averager 32 if the current mirrors CM1 and CM2 are arranged so that the reflected current is one half the impinging current.

The embodiment of FIG. 4 may find use in current mode SLICs without the further circuitry discussed below if, for example, only a DC impedance is to be fed back to the two-wire side of the SLIC, but the AC component I5 is to be used elsewhere in the SLIC. The averager 32 may be conventional.

Figure 5:
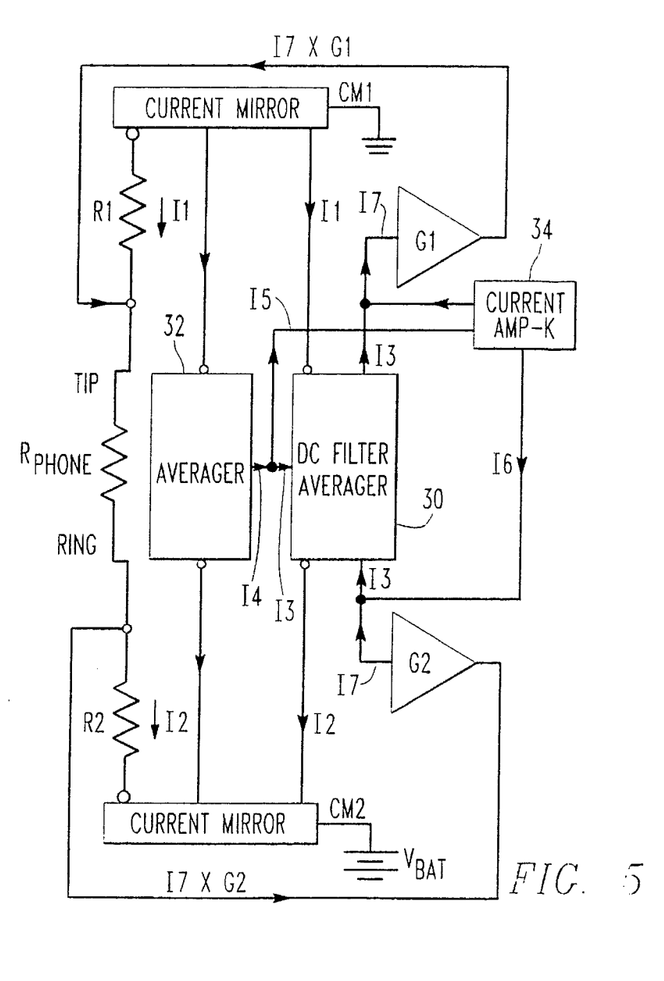
FIG. 5 is a partial block diagram of a modification of the embodiment of FIG. 4.

With reference now to FIG. 5, the separated AC component I5 may be amplified in current amplifier 34 to provide amplified AC component I6. A combination I7 of the amplified AC component I6 and the DC component I3 may be provided to the current gain blocks G1 and G2.

$$I6=K \times I5=K \times (I1AC+I2AC)/2 \quad (10)$$

$$I7=I3+I6=(I1DC+I2DC+K \times I1AC+K \times I2AC)/2 \quad (11)$$

In the embodiment of FIG. 5 the DC and AC components have been separated; the AC component separately amplified by a value K, and DC and amplified components combined before being fed back to the two-wire side of the SLIC. In the event G1 and G2 are equal, as they typically are, the impedances for the tip and ring connections are equal since they use current I7, although the AC impedance may be different than the DC impedance. That is:

$$Z_{TIP}DC=Z_{RING}DC=(R1+R2)/(2 \times G) \quad (12)$$

$$Z_{TIP}AC=Z_{RING}AC=(R1+R2)/(2 \times K \times G) \quad (13)$$

Figure 6:
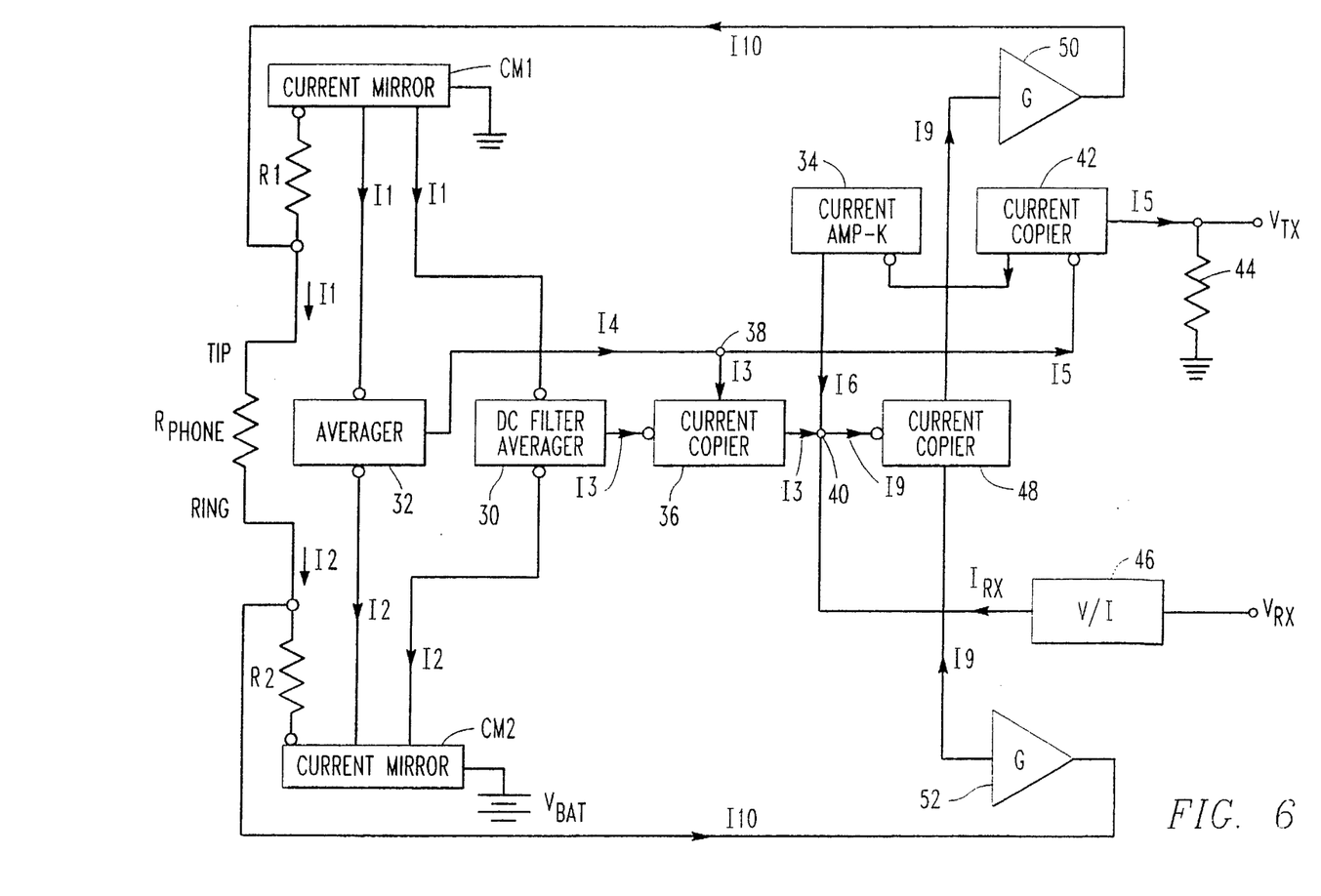
FIG. 6 is a part block and part circuit diagram of an embodiment of the present invention in which AC and DC impedances may be separately set.

FIG. 6 illustrates, in block form, an embodiment of the improved circuitry for a SLIC. The blocks contain conventional components and further explanation is not required for those of skill in the art. Starting from the two-wire side of the SLIC, tip and ring currents I1 and I2 are provided by mirrors CM1 and CM2 to the filter 30 and the averager 32. The DC components from the filter 30 may be copied in current copier 36 that provides copies of I3 to node 38, where I3 joins current I4 to provide I5, and to node 40. I5 is copied in copier 42 and amplified by K in current amplifier 34 to provide I6 to node 40. I5 is also copied and imposed across resistor 44 to provide the transmit signal voltage $V_{TX}$. The receive signal voltage $V_{RX}$ is converted to a receive current IRX in converter 46 and provided to node 40. At node 40 I3 joins I6 and IRX to provide I9. I9 is the combination of receive current, and tip and ring currents that is desirably used for impedance matching.

$$I9 = I3 + I6 + IRX \quad (14)$$

I9 is copied in current copier 48 and provided to current gain blocks 50 and 52, where it is amplified by a factor G and provided to the tip and ring connections.

$$I10 = I9 \times G \quad (15)$$

The embodiment of FIG. 6 provides separately controllable AC and DC impedances as shown above in equations (12) and (13). It uses conventional components that may be included in an integrated circuit to provide the advantages of matching components available in integrated circuit SLICs.

Figure 7:
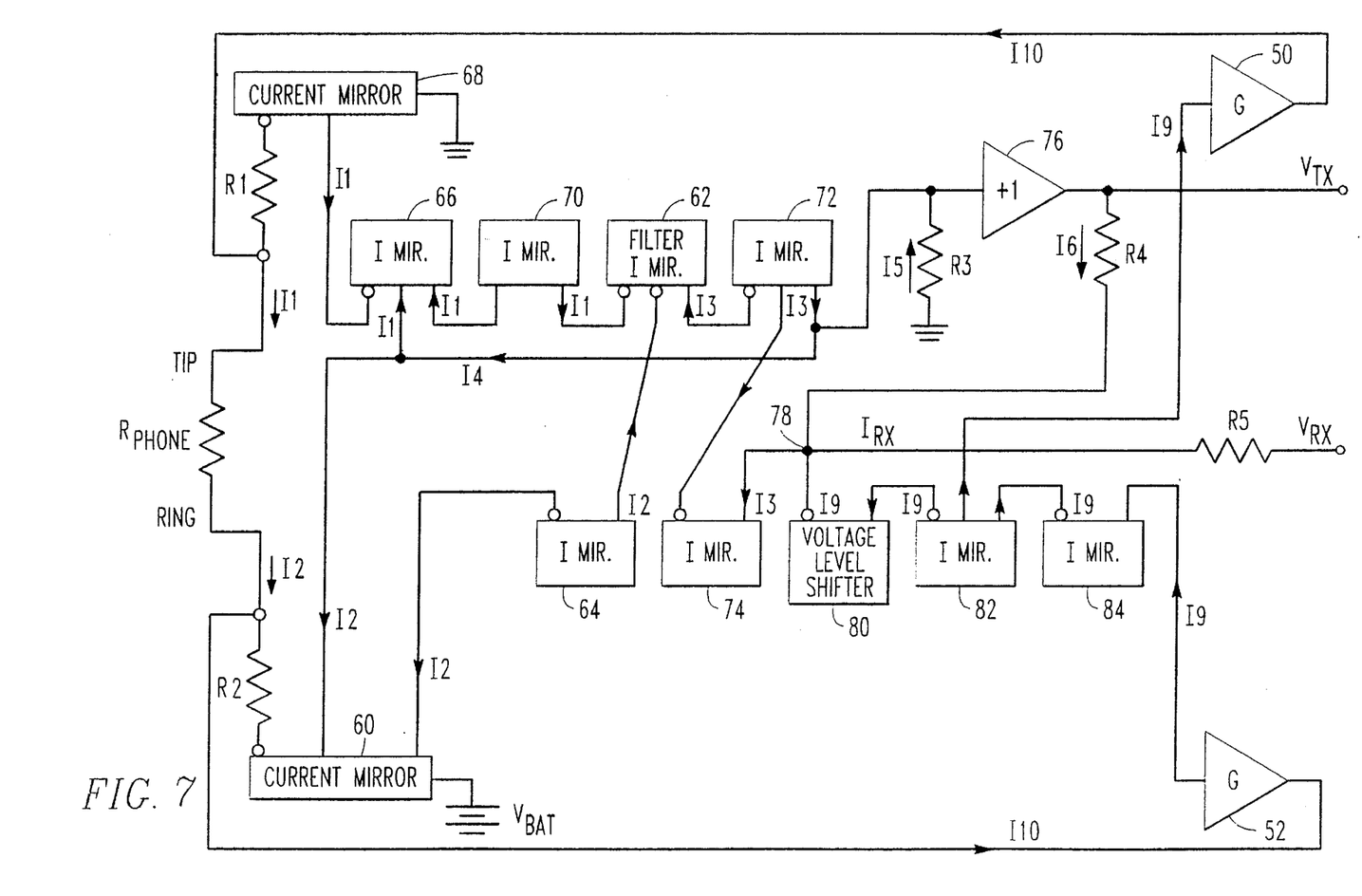
FIG. 7 is a part block and part circuit diagram of a further embodiment of the present invention in which AC and DC impedances may be separately set and in which SLIC four-wire to two-wire gain may be set separately from SLIC two-wire to four-wire gain.

The embodiment of FIG. 6 may be modified, again with conventional components that may be part of a SLIC integrated circuit, to provide the additional advantage of separately controllable four-wire to two-wire and two-wire to four-wire gains. With reference now to FIG. 7, in which the same current designations as in FIG. 6 have been used in the interest of clarity, I2 is mirrored twice by current mirror 60, with one copy being provided to DC filter 62 through mirror 64, and one copy being provided to mirror 66. I1 is copied once by mirror 68 and twice by mirror 66. One of the copies of I1 from mirror 66 joins I2 to provide I4, and the other copy is provided to filter 62 through mirror 70. The output of the filter 62 is thus I3, the DC component. Two copies of I3 are made by mirror 72, one copy being provided to mirror 74, and the other is joined with I4 and imposed across resistor R3 to provide I5. I5 is buffered in amplifier 76 to provide $V_{TX}$. $V_{TX}$ is also impressed across resistor R4 to provide I6 that is provided to node 78 where it is joined by I3 from mirror 74.

The voltage $V_{RX}$ is impressed across resistor R5 to provide IRX, and IRX is also provided to node 78 where it joins I6 and I3 to provide I9 for voltage level shifter 80. Voltage shifter 80 sets the low impedance current input at a convenient voltage. I9 is provided from shifter 80 to mirrors 82 and 84 to provide the drive currents for current gain blocks 50 and 52.

Note that:

$$I6 = I5(R3/R4) \quad (16)$$

By combining equations (10) and (16), $$K = R3/R4 \quad (17)$$

Thus, the impedances at the tip and ring connections are:

$$Z_{TIP}DC = Z_{RING}DC = (R1+R2)/(2 \times G) \quad (18)$$

$$Z_{TIP}AC = Z_{RING}AC = (R4/R3)(R1+R2)/(2 \times G) \quad (19)$$

As is apparent, the AC impedance may be set separately from the DC impedance simply by changing one or both of the resistors R3 and R4 appropriately. These resistors may be conventional, may be variable, or may be selected from a set of resistors with predetermined resistances.

The resistors R3 and R4 also may be used to set four-wire to two-wire gain, and two-wire to four-wire gain. The gains may be calculated:

$$A_{4w-2w} = [(R1+R2) \times R4]/(2 \times R5 \times R3) \quad (20)$$

$$A_{2w-4w} = R3/(R1+R2) \quad (21)$$

As with the AC and DC impedances, the two gains may be separately set simply by selecting R3 and R4 appropriately.

While preferred embodiments of the present invention have been described, it is to be understood that the embodiments described are illustrative only and the scope of the invention is to be defined solely by the appended claims when accorded a full range of equivalence, many variations and modifications naturally occurring to those skilled in the art from a perusal hereof.

What is claimed is:

1. A circuit for setting AC and DC impedances for tip and ring connections of a subscriber line interface circuit (SLIC) comprising:

first means for providing an average current of DC components of SLIC tip and ring voltages;

second means for providing an average current of AC components of SLIC tip and ring voltages; and third means for changing the amplitude of the average current of AC components relative to the amplitude of the average current of DC components, whereby the AC and DC impedances are separately set.

2. The circuit of claim 1 wherein said first means comprises a DC filter for removing AC components from tip and ring currents that are proportional to tip and ring voltages, and a first averager for averaging the currents of the DC components remaining.

3. The circuit of claim 1 wherein said second means comprises a second averager for averaging tip and ring currents, and a combiner for combining the average current of DC components from said first means with the average of tip and ring currents from said second averager to provide the average current of AC components.

4. The circuit of claim 3 wherein said third means comprises means for increasing the gain of the average current of AC components from said combiner.

5. The circuit of claim 1 further comprising means for amplifying a combination of (a) the average current of DC components from said first means, (b) the amplified average current of AC components from said third means, and (c) a current proportional to a receive voltage, and for providing the amplified combination to the tip and ring connections of the SLIC.

6. The circuit of claim 1 wherein said third means comprises a voltage amplifier between two resistors for amplifying the average current of AC components, and wherein a ratio of resistances of said two resistors sets SLIC four-wire to two-wire gain and the AC impedance for the tip and ring connections.

7. A current mode subscriber line interface circuit (SLIC) for a telephone system, the SLIC comprising current means for separately setting AC and DC impedances for tip and ring connections of the SLIC and resistive means for setting SLIC four-wire to two-wire gain separately from SLIC two-wire to four-wire gain.

8. A circuit for setting two-wire to four-wire and four-wire to two-wire gains for a subscriber line interface circuit (SLIC) comprising:

first means for providing an average current of DC components of SLIC tip and ring voltages;

second means for providing an average current of AC components of SLIC tip and ring voltages; and third means for changing the amplitude of the average current of AC components separately from changes to the amplitude of the average current of DC components, whereby SLIC two-wire to four-wire gain and SLIC four-wire to two-wire gain are separately set.

9. The circuit of claim 8 wherein said third means comprises a voltage amplifier between two resistors for amplifying the average current of AC components, and wherein a ratio of resistances of said two resistors sets SLIC four-wire to two-wire gain and the resistance of one of said two resistors sets SLIC two-wire to four-wire gain.

10. A subscriber line interface circuit (SLIC) for a telephone system, the SLIC comprising current mode means for separately setting SLIC four-wire to two-wire gain and SLIC two-wire to four-wire gain.

11. The SLIC of claim 10 wherein said current mode means further comprises means for separately setting AC and DC impedances for tip and ring connections of the SLIC.

12. A subscriber line interface circuit (SLIC) comprising:

first and second current mirrors for providing separate tip and ring currents that are respectively proportional to tip and ring voltages at a two-wire side of the SLIC;

a DC filter and a first averager for providing an average current of DC components of the tip and ring currents;

a second averager for providing an average current of the tip and ring currents;

means for providing an average current of AC components of the tip and ring currents by removing the average of DC components from the average of tip and ring currents;

a current amplifier for amplifying the average current of AC components of the tip and ring currents, and for providing a copy of the amplified current from said current amplifier to a transmit voltage connection at a four-wire side of the SLIC;

a voltage to current converter for providing a receive current proportional to a receive voltage at the four-wire side of the SLIC;

combiner means for providing a feedback current by combining the receive current, the amplified average current of AC components from said current amplifier, and the average current of DC components from said first averager; and two amplifiers for amplifying said feedback current and providing the amplified feedback current to the two-wire side of the SLIC.

13. The SLIC of claim 12 wherein said current amplifier further comprises a voltage amplifier between two resistors for amplifying the average current of AC components, and wherein a ratio of resistances of said two resistors sets SLIC four-wire to two-wire gain and AC impedance for tip and ring connections.

14. A method of setting AC and DC impedances for tip and ring connections of a subscriber line interface circuit (SLIC) comprising the steps of:

(a) providing an average current of DC components of SLIC tip and ring voltages;

(b) providing an average current of AC components of SLIC tip and ring voltages; and (c) changing the amplitude of the average current of AC components relative to the amplitude of the average current of DC components, whereby the AC and DC impedances are separately set.

15. The method of claim 14 wherein the average current of DC components is provided by filtering AC components from tip and ring currents that are proportional to tip and ring voltages, and averaging the currents of the DC components remaining.

16. The method of claim 14 wherein the average current of AC components is provided by averaging tip and ring currents, and removing the average current of DC components from step (a) from the averaged tip and ring currents.

17. The method of claim 14 further comprising the step of providing a voltage amplifier between two resistors at a transmit voltage connection for setting SLIC four-wire to two-wire gain and the AC impedance for the tip and ring connections, wherein a ratio of resistances of said two resistors sets the gain and the AC impedance.

18. A method of operating a current mode subscriber line interface circuit (SLIC) for a telephone system, comprising the steps of separately setting AC and DC impedances for tip and ring connections of the SLIC; and setting SLIC four-wire to two-wire gain separately from SLIC two-wire to four-wire gain.

19. A method of setting two-wire to four-wire and four-wire to two-wire gains for a subscriber line interface circuit (SLIC) comprising steps of:

providing an average current of DC components of SLIC tip and ring voltages;

providing an average current of AC components of SLIC tip and ring voltages;

changing the amplitude of the average current of AC components separately from changes to the amplitude of the average current of DC components, whereby SLIC two-wire to four-wire gain and SLIC four-wire to two-wire gain are separately set.

20. A method of operating a current mode subscriber line interface circuit (SLIC) for a telephone system, comprising the steps of separately setting SLIC four-wire to two-wire gain and SLIC two-wire to four-wire gain.

* * * * *

UNITED STATES PATENT AND TRADEMARK OFFICE
CERTIFICATE OF CORRECTION

PATENT NO. : 5,515,434

DATED : May 7, 1996

INVENTOR(S) : Gerald M. Coutreau

It is certified that error appears in the above-identified patent and that said Letters Patent are hereby corrected as shown below:

Item [73],

Assignee should be -- Harris Corporation, Melbourne, FL

Signed and Sealed this

Twenty-fourth Day of March, 1998

*Attest:*

BRUCE LEHMAN

*Attesting Officer*         *Commissioner of Patents and Trademarks*